United States Patent [19]
Gray

[11] Patent Number: 5,518,197
[45] Date of Patent: May 21, 1996

[54] SEAT BELT RETRACTOR WITH AUTOMATIC LOCKING MECHANISM

[75] Inventor: Mark F. Gray, Attica, Mich.

[73] Assignee: TRW Vehicle Safety Systems Inc., Lyndhurst, Ohio

[21] Appl. No.: 327,051

[22] Filed: Oct. 21, 1994

[51] Int. Cl.⁶ .................................................. B60R 22/415
[52] U.S. Cl. ........................................................ 242/382.2
[58] Field of Search ........................... 242/382.2, 382.1, 242/382.4; 280/806, 807; 297/478, 476

[56] References Cited

U.S. PATENT DOCUMENTS

| | | |
|---|---|---|
| 4,749,141 | 6/1988 | Young . |
| 4,749,143 | 7/1988 | Tsukamoto et al. . |
| 4,811,912 | 3/1989 | Takada ................................. 242/382.2 |
| 4,817,885 | 4/1989 | Matsumoto .......................... 242/382.2 |
| 4,948,066 | 8/1990 | Matsumoto et al. . |
| 4,951,896 | 8/1990 | Rittersdorf . |
| 5,080,299 | 1/1992 | Gray et al. . |
| 5,192,035 | 3/1993 | Dufour . |
| 5,257,754 | 11/1993 | Hishon . |

OTHER PUBLICATIONS

Two photographs of a prior art apparatus.

*Primary Examiner*—John M. Jillions
*Attorney, Agent, or Firm*—Tarolli, Sundheim, Covell, Tummino & Szabo

[57] ABSTRACT

A seat belt retractor (14) includes a spool (16) supported for winding and unwinding rotation. A locking pawl (60) has a locking position in which it extends into the path of movement of ratchet teeth (58) on the spool (16) so as to block unwinding rotation of the spool (16). The retractor (14) further includes a cycloidal gear (90) which rotates in an opposite direction and at a slower speed relative to the spool (16) in response to rotation of the spool (16). An actuator spring (140) has a first over-center condition in which it biases a lever (120) to pivot in a first direction, and has a second over-center condition in which it biases the lever (120) to pivot in a second direction. A pawl spring (124) moves the pawl (60) to the locking position in response to pivotal movement of the lever (120) in the second direction. The actuator spring (140) is switched between the first and second over-center conditions in response to rotation of the cycloidal gear (90).

11 Claims, 4 Drawing Sheets

Fig.7

SEAT BELT RETRACTOR WITH AUTOMATIC LOCKING MECHANISM

FIELD OF THE INVENTION

The present invention relates to a seat belt retractor, and particularly relates to a seat belt retractor having an automatic locking mechanism.

BACKGROUND OF THE INVENTION

A seat belt system for restraining an occupant of a vehicle ordinarily includes seat belt webbing, a seat belt buckle, and a seat belt retractor. A locking tongue is connected to the webbing and is releasably lockable in the buckle when the webbing is extended around the vehicle occupant. The retractor includes a spool upon which the webbing is wound. The spool rotates in an unwinding direction when the vehicle occupant extracts the webbing from the retractor and moves the webbing toward the extended position in which the tongue is locked in the buckle. When the tongue is subsequently unlocked and released from the buckle, a rewind spring in the retractor rotates the spool in a winding direction to retract the webbing into the retractor.

When the vehicle experiences a collision, the vehicle decelerates and the vehicle occupant wearing the seat belt webbing moves forcefully against the webbing. The force which is then applied to the webbing by the vehicle occupant urges the webbing to move outward from the retractor. Therefore, a seat belt retractor typically includes an emergency locking mechanism which blocks unwinding rotation of the spool in response to sudden vehicle deceleration and/or sudden extracting movement of the webbing. The emergency locking mechanism thus prevents the webbing from moving outward from the retractor when the vehicle experiences a collision.

In some seat belt systems, the webbing is prevented from being further extracted from the retractor throughout the time that the webbing is secured around the vehicle occupant, i.e., the webbing is maintained in a cinched condition. The retractor in such a seat belt system includes an automatic locking mechanism. The automatic locking mechanism places the webbing in the cinched condition automatically when the webbing is extracted from the retractor in preparation for locking of the tongue in the buckle. The automatic locking mechanism maintains the webbing in the cinched condition as long the webbing remains extracted from the retractor, and releases the webbing from the cinched condition automatically when the webbing is subsequently retracted into the retractor after the tongue is unlocked from the buckle.

SUMMARY OF THE INVENTION

In accordance with the present invention, a seat belt retractor includes a spool, a pawl, and a gear. The spool has ratchet teeth, and is supported for winding and unwinding rotation. The pawl has a locking position in which it extends into the path of movement of the ratchet teeth on the spool so as to block unwinding rotation of the spool. The gear is supported for rotation relative to the spool. A driving means imparts cycloidal rotation to the gear so as to rotate the gear in an opposite direction, and at a slower speed, relative to the spool in response to rotation of the spool.

The retractor further includes a lever which is supported for pivotal movement relative to the pawl, and an actuator spring which biases the lever to pivot relative to the pawl. The actuator spring has a first over-center condition in which it biases the lever to pivot in a first direction, and has a second over-center condition in which it biases the lever to pivot in a second direction. A locking means moves the pawl to the locking position in response to pivotal movement of the lever in the second direction. A switching means switches the actuator spring between the first and second over-center conditions in response to rotation of the gear.

In a preferred embodiment of the present invention, the switching means switches the actuator spring from the first over-center condition to the second over-center condition upon completion of a predetermined amount of rotation of the gear in response to a predetermined amount of unwinding rotation of the spool. The actuator spring then pivots the lever in the second direction and, as a result, the locking means moves the pawl to the locking position. The retractor thus blocks unwinding rotation of the spool automatically in response to the predetermined amount of unwinding rotation of the spool.

In a similar manner, the switching means switches the actuator spring back from the second over-center condition to the first over-center condition upon completion of a predetermined amount of subsequent rotation of the gear in response to a predetermined amount of subsequent winding rotation of the spool. The actuator spring then pivots the lever in the second direction and, as a result, the locking means moves the pawl out of the locking position. The retractor thus releases the spool for unwinding rotation in response to a predetermined amount of winding rotation of the spool following a predetermined amount of unwinding rotation of the spool.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
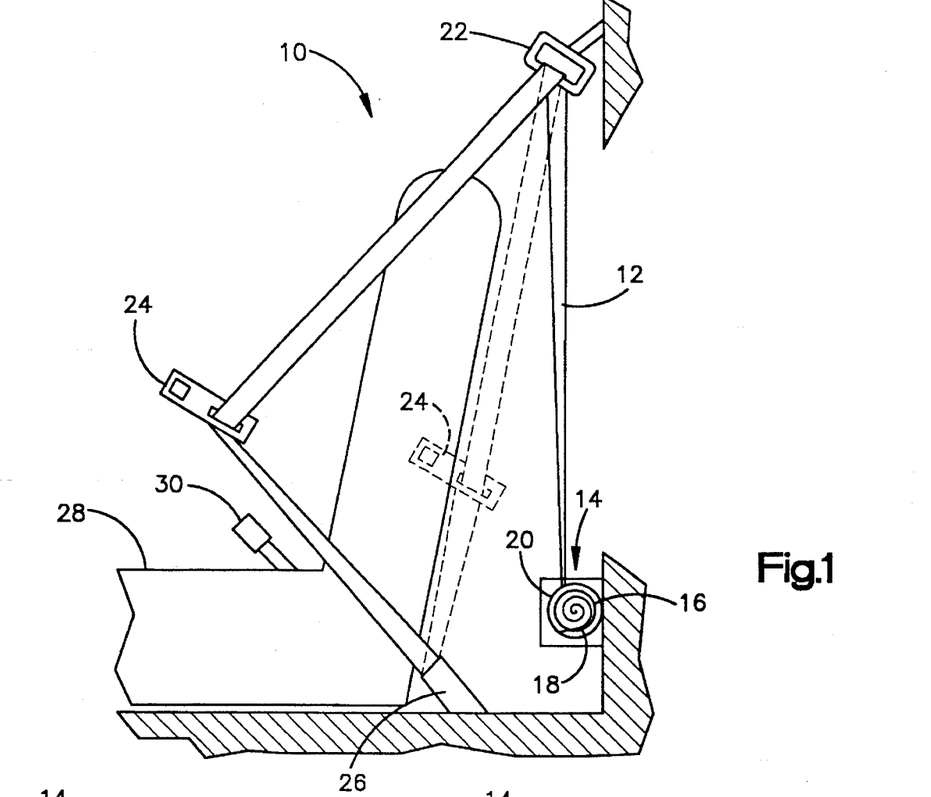
FIG. 1 is a schematic view of a vehicle occupant restraint apparatus comprising a preferred embodiment of the present invention.

A vehicle occupant restraint apparatus 10 comprising a preferred embodiment of the present invention is shown schematically in FIG. 1. The apparatus 10 is a seat belt system including seat belt webbing 12 and a seat belt retractor 14 for the webbing 12. The retractor 14 includes a spool 16 to which the webbing 12 is connected, and includes a rewind spring 18 for the spool 16. The rewind spring 18 acts between the spool 16 and a spring cover 20 so as to bias the spool 16 to rotate in a winding direction. The seat belt system 10 further includes a D-ring 22, a locking tongue 24 and an anchor 26. The webbing 12 extends from the retractor 14 to the anchor 26 through the D-ring 22 and the tongue 24.

The webbing 12 is movable back and forth between a fully retracted position and a fully extracted position upon winding and unwinding of the webbing 12 on the spool 16 in the retractor 14. When the webbing 12 is in the fully retracted position, it is fully wound onto the spool 16, and a portion of the webbing 12 is located on one side of an associated vehicle seat 28, as shown in dashed lines in FIG. 1. When the webbing 12 is in the fully extracted position, it is fully unwound from the spool 16, and is extracted from the retractor 14 sufficiently to enable the tongue 24 to reach a buckle 30 at the other side of the seat 28. The rewind spring 18 is stressed as the spool 16 rotates in an unwinding direction when a vehicle occupant extracts the webbing 12 from the retractor 14 and moves the tongue 24 toward the buckle 30. When the vehicle occupant releases the tongue 24 from the buckle 30, the rewind spring 18 rotates the spool 16 in the winding direction to retract the webbing 12 into the retractor 14, and thereby to move the webbing 12 back to the fully retracted position.

Figure 2A:
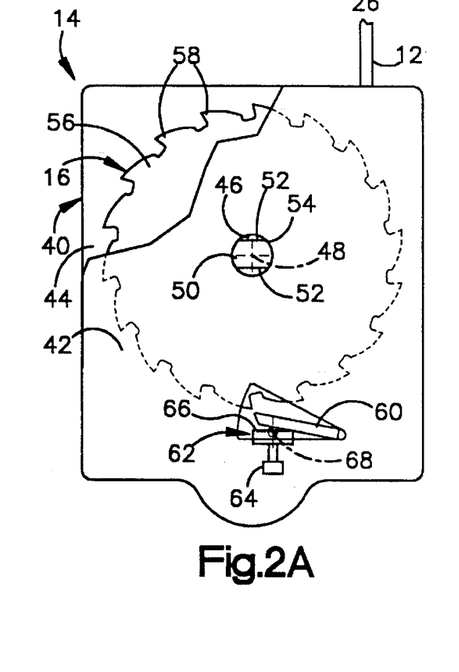
FIG. 2A is a schematic view of parts of the apparatus of FIG. 1.
Figure 2B:
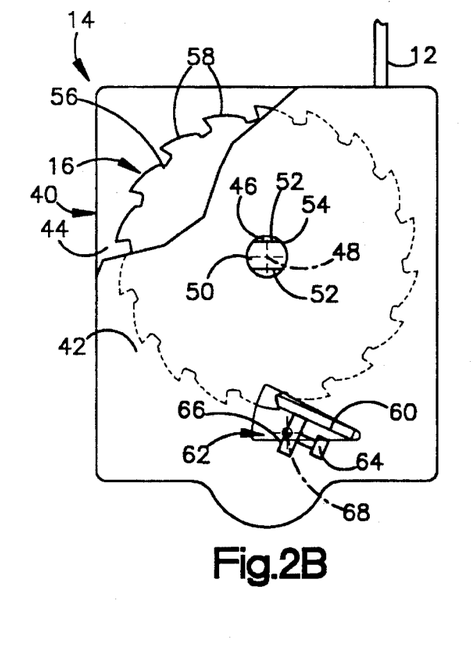
FIG. 2B is a schematic view showing the parts of FIG. 2A in different positions.

As shown in somewhat greater detail in FIGS. 2A and 2B, the retractor 14 includes a frame 40 having first and second opposite side walls 42 and 44. The spool 16 has a central shaft 46 which extends across the frame 40 between the side walls 42 and 44. The spool shaft 46 is supported by the side walls 42 and 44 for rotation about a longitudinal central axis 48 in the winding direction, which is clockwise as viewed in FIGS. 2A and 2B, and in the unwinding direction, which is counterclockwise as viewed in FIGS. 2A and 2B.

A first end portion 50 of the spool shaft 46 projects axially outward from the first side wall 42 of the frame 40. The first end portion 50 of the spool shaft 46 has a pair of diametrically opposed flat surface portions 52 which interrupt an otherwise cylindrical outer surface 54. A second end portion (not shown) of the spool shaft 46 projects axially outward from the second side wall 44 at the opposite side of the frame 40, and is connected with the rewind spring 24 (FIG. 1) in a known manner. The spool 16 further includes a pair of ratchet wheels 56, one of which is shown in FIGS. 2A and 2B. Each of the ratchet wheels 56 has ratchet teeth 58 and is fixed to the spool shaft 46 to rotate about the axis 48 with the spool shaft 46.

The retractor 14 also includes a locking pawl 60 and an emergency locking mechanism 62. The pawl 60 extends across the frame 40 between the side walls 42 and 44, and is supported by the side walls 42 and 44 for pivotal movement between a non-locking position and a locking position. When the pawl 60 is in the non-locking position, as shown in FIG. 2A, it is spaced from the ratchet teeth 58 on the spool 16. When the pawl 60 is in the locking position, as shown in FIG. 2B, it extends into the path of movement of the ratchet teeth 58 to block rotation of the spool 16 in the unwinding direction.

The emergency locking mechanism 62 includes an inertia member 64 and a lever 66. The inertia member 64 and the lever 66 are supported between the side walls 42 and 44 of the frame 40 for pivotal movement about an axis 68. When the vehicle experiences a predetermined amount of deceleration, the inertia member 64 and the lever 66 pivot about the axis 68 from the positions shown in FIG. 2A to the positions shown in FIG. 2B. The predetermined amount of deceleration is an amount which indicates the occurrence of a vehicle collision for which the webbing 12 is required to restrain an occupant of the seat 28 (FIG. 1).

When the lever 66 pivots to the position of FIG. 2B, it moves against the pawl 60 to pivot the pawl 60 to the locking position. The spool 16 is thus prevented from rotating in the unwinding direction upon the occurrence of vehicle deceleration indicative of a collision. As a result, the webbing 12 cannot be further unwound from the spool 16 during a collision, and restrains an occupant of the seat 28 accordingly. Emergency locking mechanisms like the emergency locking mechanism 62 are known in the art. The retractor 14 could include an alternative emergency locking mechanism, such as one that responds to sudden unwinding rotation of the spool 16. Such alternative emergency locking mechanisms also are known in the art.

As shown in FIGS. 3–7, the retractor 14 further includes an automatic locking mechanism 80. The automatic locking mechanism 80 has an unactuated condition and an actuated condition. When the automatic locking mechanism 80 is in the unactuated condition, it allows the spool 16 to rotate in the winding and unwinding directions. When the webbing 12 is moved from the fully retracted position of FIG. 1 to the fully extracted position, the automatic locking mechanism 80 automatically switches from the unactuated condition to the actuated condition. It then continues to allow the spool 16 to rotate in the winding direction, but cooperates with the pawl 60 to block rotation of the spool 16 in the unwinding direction. The webbing 12 is thus placed in a "cinched" condition when the automatic locking mechanism 80 switches to the actuated condition. (Hereafter, the webbing 12 will be referred to as "cinched" when the automatic locking mechanism 80 is in the actuated condition.)

The automatic locking mechanism 80 remains in the actuated condition as long as the webbing 12 is fastened about an occupant of the seat 28 by the tongue 24 and the buckle 30. The automatic locking mechanism 80 thus maintains the webbing 12 in a cinched condition as long as the webbing 12 is fastened about an occupant of the seat 28. When webbing 12 is returned to the fully retracted position of FIG. 1, the automatic locking mechanism 80 automatically switches back from the actuated condition to the unactuated condition. It then allows the spool 16 again to rotate in the unwinding direction upon subsequent extracting movement of the webbing 12.

As shown in detail in FIGS. 3–7, the automatic locking mechanism 80 includes a plastic housing 82 which is mounted on the first side wall 42 of the frame 40. The plastic housing 82 defines a stationary internal gear 84. The internal gear 84 has gear teeth 86 centered on the spool axis 48. A cam 88 and a cycloidal gear 90 are located radially inward of the internal gear 84.

The cam 88 is a disc which is mounted eccentrically on the first end portion 50 of the spool shaft 46. A circular outer edge surface 92 of the cam 88 faces radially outward toward the cycloidal gear 90. An inner edge surface 94 of the cam 88 defines an opening through which the first end portion 50 of the spool shaft 46 extends, and has a contour matching the contour of the outer surface 54 of the first end portion 50 of the spool shaft 46. The flat portions 52 of the outer surface 54 are thus engaged with corresponding flat portions of the inner edge surface 94 so as to block rotation of the cam 88 relative to the spool shaft 46. The cam 88 is thus mounted on the spool shaft 46 so as to rotate with the spool 16 about the spool axis 48 in the winding and unwinding directions.

The cycloidal gear 90 has gear teeth 96 centered on a cycloidal axis 98 which is spaced radially from the spool axis 48. One of the gear teeth 96 supports an actuator tab 100. The actuator tab 100 projects axially inward from the cycloidal gear 90 toward the first side wall 42 of the frame 40. The gear teeth 96 on the cycloidal gear 90 mesh with the gear teeth 86 on the internal gear 84. The cycloidal gear 90 is thus supported for rotation about the cycloidal axis 98 in meshing engagement with the internal gear 84. When the cycloidal gear 90 rotates about the cycloidal axis 98, the cycloidal gear 90 rolls inside the internal gear 84, and the actuator tab 100 on the cycloidal gear 90 moves along a cycloidal path of movement extending circumferentially around the spool axis 48.

The cycloidal gear 90 further has a circular inner edge surface 102 which faces radially inward toward the circular outer edge surface 92 of the cam 88. The circular outer edge surface 92 of the cam 88 is engaged with the circular inner edge surface 102 of the cycloidal gear 90 in rotational sliding contact. Moreover, the cam 88 holds the cycloidal gear 90 in meshing engagement with the internal gear 84 radially between the cam 88 and the internal gear 84.

When the cam 88 rotates with the spool 16 about the spool axis 48 in one direction, the cycloidal gear 90 rotates about the cycloidal axis 98 in the opposite direction in a know manner. For example, when the cam 88 rotates about the spool axis 48 in the counterclockwise direction, the cam 88 pushes the gear teeth 96 on the cycloidal gear 90 into meshing engagement with the gear teeth 86 on the internal gear 84 successively in the counterclockwise direction. As the gear teeth 96 move successively into meshing engagement with the gear teeth 86 in the counterclockwise direction, the cycloidal gear 90 rolls around the inside of the internal gear 84 in the counterclockwise direction. As the cycloidal gear 90 rolls around the inside of the internal gear 84 in the counterclockwise direction, it rotates about its own axis 98 in the clockwise direction.

Additionally, each time the cam 88 completes one revolution about the spool axis 48, the actuator tab 100 on cycloidal gear 90 completes only a portion of its cycloidal path of movement around the spool axis 48. In addition to rotating in the opposite direction, the cycloidal gear 90 thus rotates at a speed, i.e., a number of revolutions per minute, which is less than the speed of the cam 88 and the spool 16. The difference between the speed of the cycloidal gear 90 and the speed of the cam 88 and the spool 16 is indicated by the difference between the number of the gear teeth 96 on the cycloidal gear 90 and the number of the gear teeth 86 on the internal gear 84. In the preferred embodiment of the present invention shown in the drawings, there are twenty two of the gear teeth 90 on the cycloidal gear and twenty four of the gear teeth 86 on the internal gear 84. Therefore, the actuator tab 100 on the cycloidal gear will move circumferentially past two of the gear teeth 86 on the internal gear 84 upon each revolution of the cam 88.

The automatic locking mechanism 80 further includes an actuator lever 120. The actuator lever 120 is supported on a hub 122 which projects axially inward from the housing 82. The hub 122 has a central axis 123, and the actuator lever 120 is supported on the hub 122 for pivotal movement about the axis 123.

A pawl spring 124 is mounted on the hub with the actuator lever 120. An outer end portion 128 of the pawl spring 124 extends around a tab 130 on the actuator lever 120, and has a pawl-lifting portion 132. The pawl spring 124 acts between the hub 122 on the housing 82 and the tab 130 on the actuator lever 120 so as to bias the actuator lever 120 to pivot about the axis 123 in a clockwise direction, as viewed in the drawings.

An actuator spring 140 also acts between the housing 82 and the actuator lever 120. A first end portion 142 of the actuator spring 140 is supported on another hub 144 on the housing 82. The hub 144 has a central axis 145. A second end portion 146 of the actuator spring 140 is supported on a hub 148 on the actuator lever 120. The actuator spring 140 biases the hub 148 on the actuator lever 120 to move away from the hub 144 on the housing 82 in a direction extending radially outward from the axis 145 of the hub 144. The actuator spring 140 thus biases the actuator lever 120 to pivot about the axis 123 of the hub 122.

Figure 3:
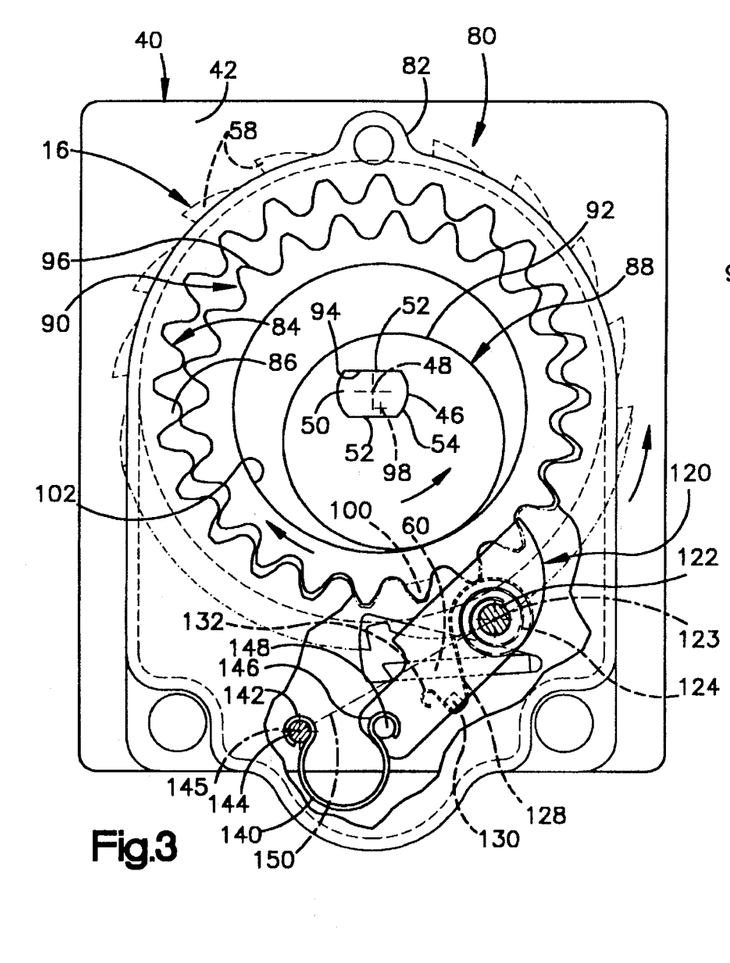
FIG. 3 is a view of parts of the apparatus of FIG. 1.
Figure 4:
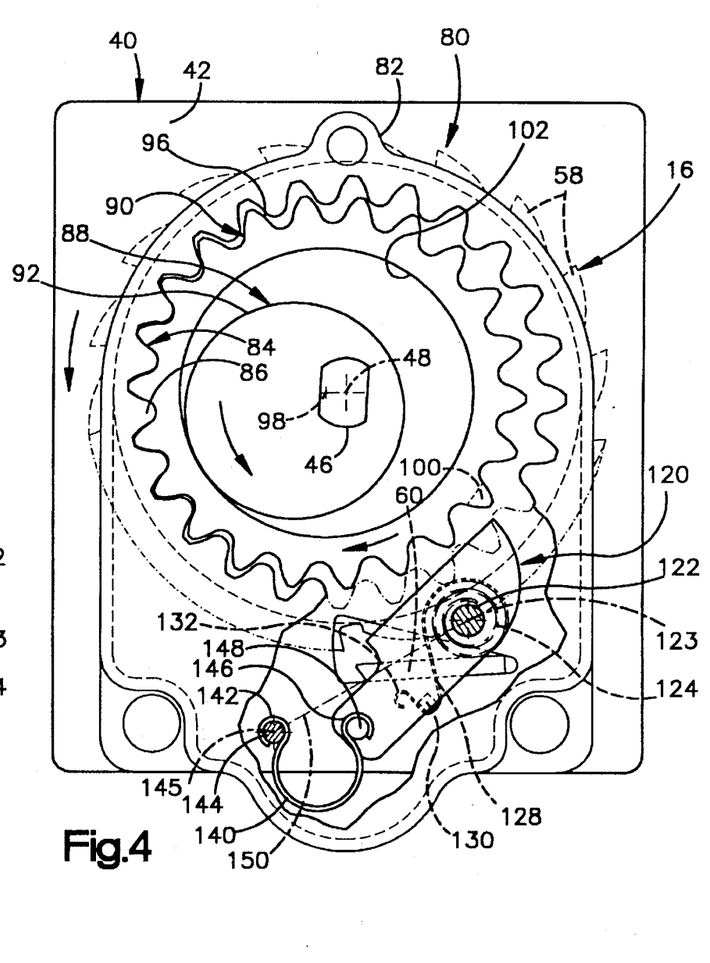
FIGS. 4, 5, 6 and 7, are views showing the parts of FIG. 3 in different positions.
Figure 5:
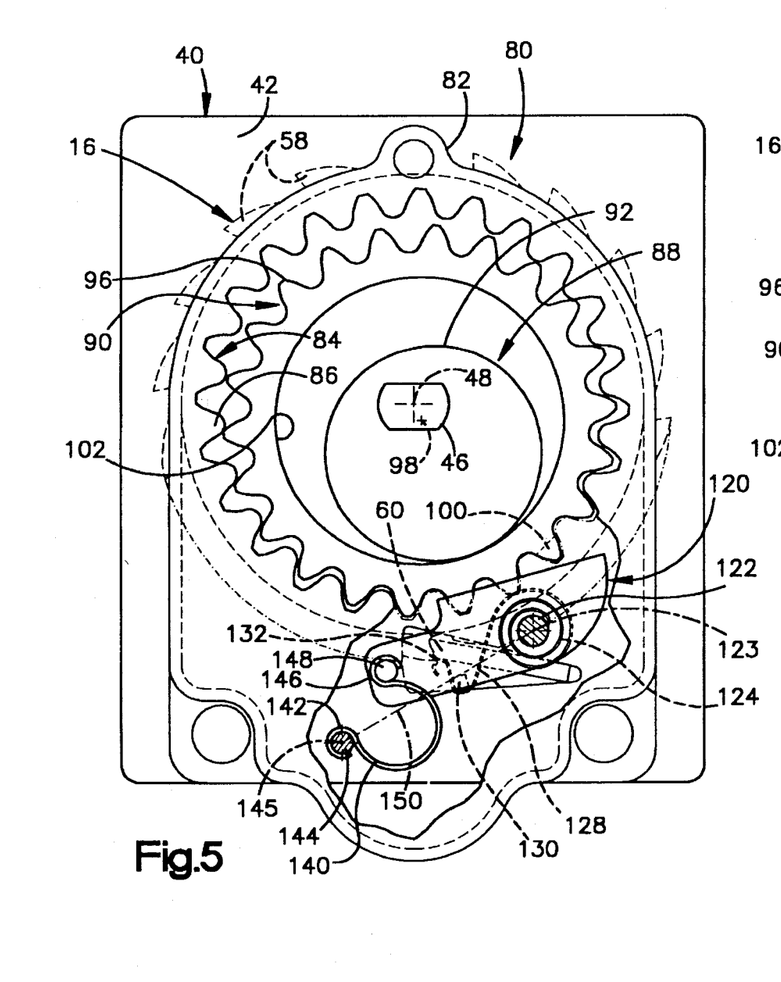

The actuator spring 140 has a first over-center condition and a second over-center condition. As shown in FIGS. 3–7, an imaginary line 150 extends between the axes 123 and 145 of the hubs 122 and 144 on the housing 82. When the hub 148 on the actuator lever 120 is located on a first side of the line 150, as shown in FIG. 3, the actuator spring 140 is in the first over-center condition. The actuator spring 140 then urges the actuator lever 120 to pivot about the axis 123 in the counterclockwise direction. When the hub 148 is located on a second side of the line 150, as shown in FIG. 5, the actuator spring 140 is in the second over-center condition. The actuator spring 140 then urges the actuator lever 120 to pivot about the axis 123 in the clockwise direction.

As described briefly above, the automatic locking mechanism 80 is in the unactuated condition when the webbing 12 is in the fully retracted position of FIG. 1. As shown in FIG. 3, the pawl 60 is then located in the non-locking position, and the actuator spring 140 is in the first over-center condition. Moreover, the actuator tab 100 on the cycloidal gear 90 is in a starting position adjacent to the actuator lever 120.

When the webbing 12 is unwound from the spool 16 upon movement of the webbing 12 from the fully retracted position toward the fully extracted position, the spool 16 and the cam 88 rotate about the spool axis 48 together in the unwinding direction, which is counterclockwise as viewed in FIG. 3. At the onset of such unwinding rotation of the spool 16 and the cam 88, the actuator tab 100 on the cycloidal gear 90 begins to move from the starting position in the clockwise direction, and thus moves away from the actuator lever 120. The actuator tab 100 continues to move around the spool axis 48 in the clockwise direction as the webbing 12 is being unwound from the spool 16, and is thus moved to the position of FIG. 4. At that time the webbing 12 is closely approaching the fully extracted position, and the actuator tab 100 is moving toward the actuator lever 120. More specifically, the actuator lever 120 extends into the cycloidal path of movement of the actuator tab 100 so that the actuator tab 100 moves forcefully against the actuator lever 120 when the actuator tab 100 is advanced from the position of FIG. 4 to the position of FIG. 5. The actuator tab 100 is thus moved against the actuator lever 120 when unwinding rotation of the spool 16 is completed as the webbing 12 reaches the fully extracted position.

When the actuator tab 100 moves against the actuator lever 120 in the forgoing manner, it pivots the actuator lever 120 about the axis 123 in the clockwise direction against the bias of the actuator spring 140. The actuator tab 100 thus moves the hub 148 on the actuator lever 120 across the imaginary line 150 from the location of FIG. 4 toward the location of FIG. 5. When the hub 148 is thus moved across the line 150, the actuator spring 140 is switched from the first over-center condition to the second over-center condition. The actuator spring 140 then pivots the actuator lever 120 farther in the clockwise direction until the pawl-lifting portion 130 of the pawl spring 124 moves against and lifts the pawl 60 pivotally to the locking position, as shown in FIG. 5. The automatic locking mechanism 80 thus switches from the unactuated condition (FIG. 3) to the actuated condition (FIG. 5) automatically in response to the amount of unwinding rotation of the spool 16 that occurs upon movement of the webbing 12 from the fully retracted position to the fully extracted position. The webbing 12 is cinched accordingly.

Figure 6:
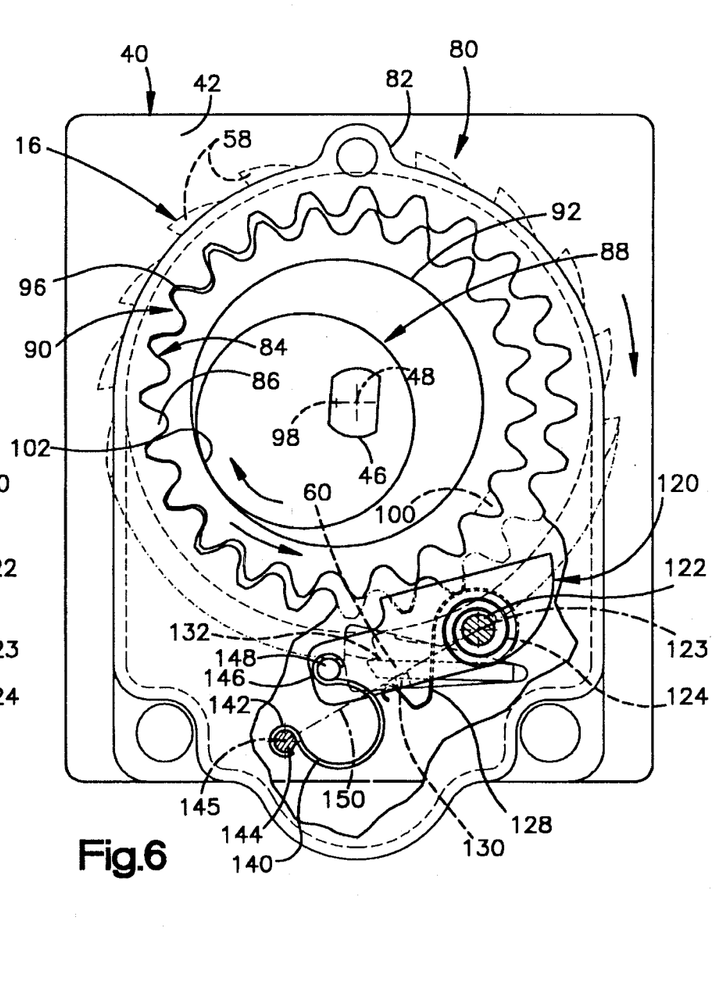

After the webbing 12 has been moved to the fully extracted position in the foregoing manner, the vehicle occupant may allow the webbing 12 to be retracted as necessary to enable the tongue 24 to be locked in the buckle 30 and/or to take up slack in the webbing 12 when the tongue 24 has been locked in the buckle 30. As shown in FIG. 6, the spool 16 and the cam 88 then rotate in the winding (clockwise) direction under the influence of the rewind spring 18 (FIG. 1). The pawl spring 124 permits the ratchet teeth 58 to move the pawl 60 out of the locking position against the bias of the pawl spring 124 as the ratchet teeth 58 move past the pawl 60 in the clockwise direction, and returns the pawl 60 to the locking position upon completion of such winding rotation of the spool 16. Moreover, such winding rotation of the spool 16 causes the cam 88 to rotate the cycloidal gear 90 in the opposite direction, i.e., in the counterclockwise direction as viewed in FIG. 6. The actuator tab 100 on the cycloidal gear 90 is thus moved away from the actuator lever 120 and partially back toward the starting position of FIG. 3. However, the actuator lever 120 continues to be held in the position of FIG. 6 by the actuator spring 140. The automatic locking mechanism 80 thus remains in the actuated condition, and maintains the webbing 12 in the cinched condition, when the webbing 12 is being retracted from the fully extracted position.

Figure 7:
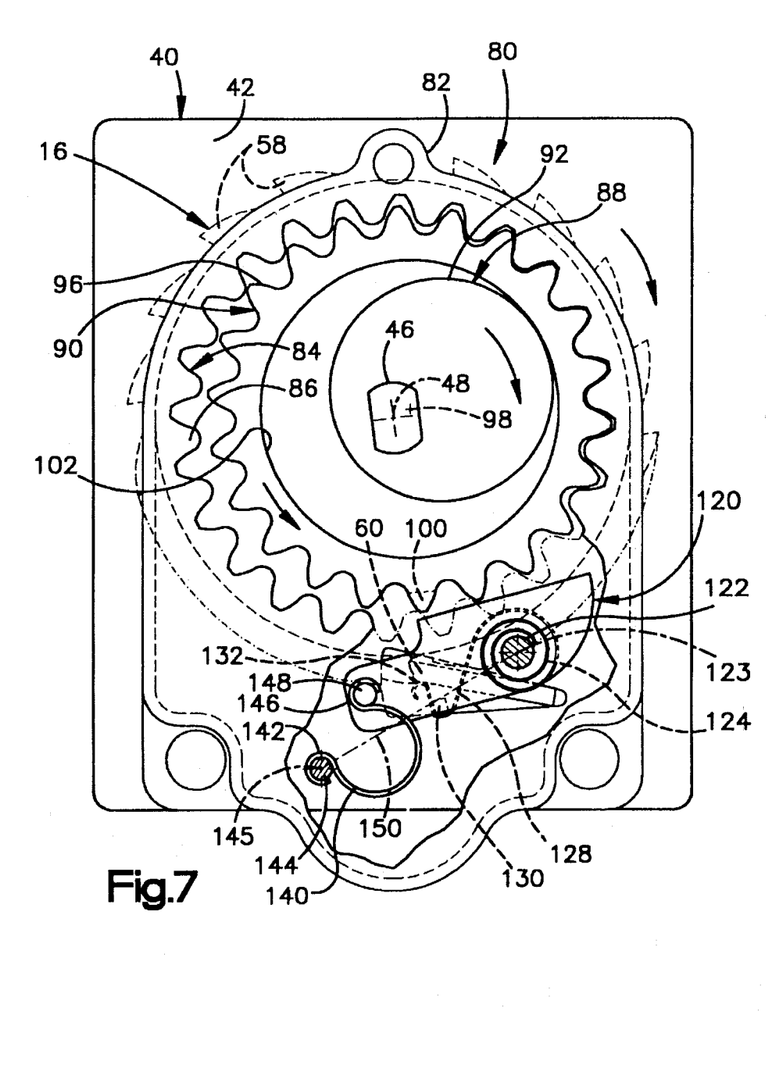

When the vehicle occupant unlocks the tongue 24 from the buckle 30 and allows the rewind spring 18 to return the webbing 12 toward the fully retracted position of FIG. 1, the rewind spring 18 rotates the spool 16 and the cam 88 in the clockwise direction from the positions of FIG. 6 to the positions of FIG. 7. The cam 88 simultaneously rotates the cycloidal gear 90 in the counterclockwise direction so as to move the actuator tab 100 on the cycloidal gear 90 from the position of FIG. 6 to the position of FIG. 7. The webbing 12 is then approaching the fully retracted position, and the actuator tab 100 is being moved back toward the starting position of FIG. 3. When the webbing reaches the fully retracted position, the actuator tab 100 is moved back into contact with, and forcefully against, the actuator lever 120. The actuator tab 100 then pivots the actuator lever 120 in the counterclockwise direction against the bias of the actuator spring 140, and thus moves the hub 148 on the actuator lever 120 back across the imaginary line 150 from the location of FIG. 7 toward the location of FIG. 3.

When the hub 148 is moved back across the line 150, the actuator spring 140 is switched from the second over-center condition to the first over-center condition. The actuator spring 140 then pivots the actuator lever 120 farther in the counterclockwise direction until the pawl-lifting portion 130 of the pawl spring 124 moves away from the pawl 60. The pawl 60 drops from the locking position to the non-locking position under the influence of gravity during such movement of the pawl spring 124 with the actuator lever 120. The automatic locking mechanism 80 thus switches from the actuated condition to the unactuated condition automatically in response to the amount of winding rotation of the spool 16 that occurs upon movement of the webbing 12 from the fully extracted position to the fully retracted position. As a result, the webbing 12 is released from the cinched condition and can again be extracted from the retractor 14.

As described above, the automatic locking mechanism 80 is actuated in response to a predetermined amount of rotation of the cycloidal gear 90 which occurs as a result of a predetermined amount of unwinding rotation of the spool 16. In the preferred embodiment of the present invention shown in the drawings, the predetermined amount of unwinding rotation of the spool 16 is the amount that occurs when the webbing 12 is moved from the fully retracted position entirely to the fully extracted position. However, it may be desirable for the automatic locking mechanism 80 to switch to the actuated condition before the webbing 12 reaches such a fully extracted position, and/or to switch back to the unactuated condition in response to a lesser amount of retraction. This could be accomplished, for example, by using a cycloidal gear that rotates at a relatively greater speed and/or throughout a smaller range of movement.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
    a spool having ratchet teeth, said spool being supported for winding and unwinding rotation;
    a pawl having a locking position in which said pawl extends into the path of movement of said ratchet teeth so as to block unwinding rotation of said spool;
    a gear supported for rotation relative to said spool;
    driving means for imparting cycloidal rotation to said gear so as to rotate said gear in an opposite direction and at a slower speed relative to said spool in response to rotation of said spool;
    a lever supported for pivotal movement relative to said pawl;
    an actuator spring biasing said lever to pivot relative to said pawl, said actuator spring having a first over-center condition in which said actuator spring biases said lever to pivot in a first direction, said actuator spring further having a second over-center condition in which said actuator spring biases said lever to pivot in a second direction;
    locking means for moving said pawl to said locking position in response to pivotal movement of said lever in said second direction; and
    switching means for switching said actuator spring between said first and second over-center conditions in response to rotation of said gear;
    said switching means comprising an actuator tab projecting axially from a gear tooth on said gear.

2. Apparatus as defined in claim 1 wherein said spool is rotatable about a spool axis, said gear being a ring-shaped cycloidal gear having external gear teeth and an inner edge surface extending around said spool axis, said external gear teeth being supported in meshing engagement with internal gear teeth on a stationary gear for cycloidal rotation of said cycloidal gear relative to said stationary gear, said cam being supported to rotate with said spool at the speed of said spool and having a cam surface engaging said inner edge surface of said cycloidal gear in rotational sliding contact so as to rotate said cycloidal gear in an opposite direction and at a slower speed relative to said spool in response to rotation of said spool.

3. Apparatus comprising:
    a spool having ratchet teeth, said spool being supported for winding and unwinding rotation;
    a pawl having a locking position in which said pawl extends into the path of movement of said ratchet teeth so as to block unwinding rotation of said spool;

a gear supported for rotation relative to said spool;

driving means for imparting cycloidal rotation to said gear so as to rotate said gear in an opposite direction and at a slower speed relative to said spool in response to rotation of said spool;

a lever supported for pivotal movement relative to said pawl;

an actuator spring biasing said lever to pivot relative to said pawl, said actuator spring having a first over-center condition in which said actuator spring biases said lever to pivot in a first direction, said actuator spring further having a second over-center condition in which said actuator spring biases said lever to pivot in a second direction;

locking means for moving said pawl to said locking position in response to pivotal movement of said lever in said second direction; and switching means for switching said actuator spring between said first and second over-center conditions in response to rotation of said gear;

said locking means including a pawl spring supported for movement with said lever, said pawl spring moving against said pawl so as to move said pawl to said locking position in response to pivotal movement of said lever in said second direction.

4. Apparatus as defined in claim 3 wherein said pawl spring is spaced from said pawl when said actuator spring is in said first over-center condition.

5. Apparatus as defined in claim 3 wherein said switching means comprises an actuator tab projecting axially from a gear tooth on said gear.

6. Apparatus comprising:

a spool having ratchet teeth, said spool being supported for winding and unwinding rotation;

a pawl having a locking position in which said pawl extends into the path of movement of said ratchet teeth so as to block unwinding rotation of said spool;

a gear supported for rotation relative to said spool;

driving means for rotating said gear at a slower speed relative to said spool in response to rotation of said spool, said driving means including a cam supported to rotate with said spool at the speed of said spool;

a lever supported for pivotal movement relative to said pawl;

an actuator spring biasing said lever to pivot relative to said pawl, said actuator spring having a first over-center condition in which said actuator spring biases said lever to pivot in a first direction, said actuator spring further having a second over-center condition in which said actuator spring biases said lever to pivot in a second direction;

locking means for moving said pawl to said locking position in response to pivotal movement of said lever in said second direction; and switching means for switching said actuator spring between said first and second over-center conditions in response to rotation of said gear;

said switching means comprises an actuator tab projecting axially from a gear tooth on said gear.

7. Apparatus comprising:

a spool having ratchet teeth, said spool being supported for winding and unwinding rotation;

a pawl having a locking position in which said pawl extends into the path of movement of said ratchet teeth so as to block unwinding rotation of said spool;

a gear supported for rotation relative to said spool;

driving means for rotating said gear at a slower speed relative to said spool in response to rotation of said spool, said driving means including a cam supported to rotate with said spool at the speed of said spool;

a lever supported for pivotal movement relative to said pawl;

an actuator spring biasing said lever to pivot relative to said pawl, said actuator spring having a first over-center condition in which said actuator spring biases said lever to pivot in a first direction, said actuator spring further having a second over-center condition in which said actuator spring biases said lever to pivot in a second direction;

locking means for moving said pawl to said locking position in response to pivotal movement of said lever in said second direction; and switching means for switching said actuator spring between said first and second over-center conditions in response to rotation of said gear;

said locking means including a pawl spring supported for movement with said lever, said pawl spring moving against said pawl so as to move said pawl to said locking position in response to pivotal movement of said lever in said second direction.

8. Apparatus as defined in claim 7 wherein said pawl spring is spaced from said pawl when said actuator spring is in said first over-center condition.

9. Apparatus comprising:

a spool having ratchet teeth, said spool being supported for winding and unwinding rotation about a spool axis;

a pawl having a locking position in which said pawl extends into the path of movement of said ratchet teeth so as to block unwinding rotation of said spool;

a stationary gear having internal gear teeth;

a ring-shaped cycloidal gear having external gear teeth and an inner edge surface extending around said spool axis, said external gear teeth being supported in meshing engagement with said internal gear teeth for cycloidal rotation of said cycloidal gear relative to said stationary gear;

a cam supported to rotate with said spool at the speed of said spool, said cam having a cam surface engaging said inner edge surface of said cycloidal gear in rotational sliding contact so as to rotate said cycloidal gear in an opposite direction and at a slower speed relative to said spool in response to rotation of said spool;

a lever supported for pivotal movement relative to said pawl;

an actuator spring having a first over-center condition in which said actuator spring biases said lever to pivot in a first direction, said actuator spring further having a second over-center condition in which said actuator spring biases said lever to pivot in a second direction;

locking means for moving said pawl to said locking position in response to pivotal movement of said lever in said second direction; and switching means for switching said actuator spring back and forth between said first and second over-center conditions in response to rotation of said cycloidal gear;

said switching means comprising a solitary actuator member supported on said cycloidal gear for movement into and out of contact with said lever upon rotation of said cycloidal gear.

10. Apparatus as defined in claim 9 wherein said actuator member is an actuator tab projecting axially from a gear tooth on said cycloidal gear.

11. Apparatus as defined in claim 9 wherein said actuator member moves against said lever to pivot said lever in said second direction upon completion of a predetermined amount of rotation of said cycloidal gear in response to a predetermined amount of unwinding rotation of said spool, said actuator member subsequently moving against said lever to pivot said lever in said first direction upon completion of a predetermined amount of subsequent rotation of said cycloidal gear in response to a predetermined amount of winding rotation of said spool following said unwinding rotation of said spool.

* * * * *